United States Patent Office 2,818,385
Patented Dec. 31, 1957

2,818,385

GREASE THICKENED WITH ORGANOSILYL-COATED SILICEOUS MATERIAL

Guy B. Alexander and Ralph K. Iler, Wilmington, Del., assignors to E. I. du Pont de Nemours and Company, Wilmington, Del., a corporation of Delaware No Drawing. Application September 14, 1954
Serial No. 456,074

6 Claims. (Cl. 252—28)

This invention relates to novel greases and more particularly to grease compositions comprising a dispersion, in a lubricating oil, of a thickener consisting of a solid, siliceous substrate having a surface of silica and a surface area of from 100 to 900 square meters per gram and having chemically bonded to silicon atoms in said silica surface an organophilic coating consisting, at least in part, of organosilyl groups, the coating being from about $1/3$ to $5/6$ complete, and the thickener being present in sufficient proportion to thicken the oil to a grease.

It is well known that finely divided silicas, and particularly silicas of high surface area, are effective thickeners for oils to make greases. However, such greases completely lack resistance to water and, indeed, when the silicas are of high surface area they have such an affinity for water they will extract it from humid air. The result is that such greases readily break down as the water vapor saturates the silica. Obviously, a grease which has no resistance to break-down in humid atmosphere has very limited commercial application.

In an effort to avoid the difficulties just mentioned it has been proposed that finely divided silicas to be used as thickeners in greases should be treated with an organosilane such as dimethyldichlorosilane to impart a hydrophobic coating to the silica and thereby prevent it from absorbing moisture from the air. Now while it is true that silica may be "hydrophobed" in this manner, the result is not satisfactory because it is found that for some unexplained reason such silicas lack a high degree of thickening efficiency for oils. For instance, an aerogel having a specific surface area of 200 m.$^2$/g. which is coated with an organosilane might provide a suitable degree of thickening in the oil when used in the proportion of 12% by weight based on the weight of the grease, whereas the same silica without coating might thicken at 9%. Thus, the thickening efficiency of the silica has been reduced by about one-third. For complete commercial acceptability a silica thickener for greases must have both hydrolytic stability and high thickening efficiency.

Now according to the present invention, it has been found that neither hydrolytic stability nor thickening efficiency is arithmetically proportional to the degree of coating of the silica with an organophilizing agent. Contrary to what might be expected, the thickening index of a coated silica—that is, the weight percent of thickener required to thicken oil to a micropenetration of 83 at 77° F., this being the inverse of the thickening efficiency—does not increase proportionately with the surface coverage of the silica. Instead if the thickening index be plotted against the degree of coverage, i. e., against the percentage of a complete layer of organophilizing groups that has actually been applied, there is a range where the thickening index does not change with increasing coverage of the surface until the coating amounts to about $5/6$ of the complete coverage of the substrate. Thereafter the thickening index increases as the remaining surface area is covered with organophilizing groups.

Fortuitously, when as much as about one-third of a complete coating with organophilizing groups has been applied the hydrolytic stability of the grease thickened with this silica starts to increase sharply and when about as much as one-half of such coverage has been reached the grease becomes completely stable in the presence of moisture.

The present invention, therefore, provides novel greases comprising a lubricating oil thickened to a grease consistency by the dispersion therein of a sufficient amount of a thickener having both a low thickening index and a high hydrolytic stability, the thickener being a solid, siliceous substrate having a surface of silica and a surface area of from 100 to 900 square meters per gram and having chemically bonded to silicon atoms in said silica surface an organophilic coating consisting, at least in part, of organosilyl groups, the coating being about from $1/3$ to $5/6$ of the complete coverage of the substrate with organophilizing groups.

A complete coating requires about four thirds of the coverage at which the "dye area" is 5% of the "nitrogen area", dye area being the remaining surface area of the substrate as determined by the dye absorption method and nitrogen area being the original surface area of the substrate as determined by the nitrogen adsorption method, both methods being as described in the Iler Patent 2,657,149. About 6 monomethylsilyl, 3.5 dimethylsilyl, 2.3 trimethylsilyl, 3.8 monoethylsilyl or 3.2 monobutyl silyl groups per square millimicron of silica substrate ordinarily gives a complete coating. From this one can calculate the amount of organosilyl groups necessary to give from one-third to five-sixths of complete coverage. If a mixture of organosilyl and ester groups are present in the coating, the combined coverage should be from one-third to five-sixths of total coverage. The covering power of various alkoxy groups is described in Iler U. S. Patent 2,657,149.

Now obviously when it is said that from one-third to five-sixths of a complete coating should be applied, such coating should be substantially uniform. Thus, it would not do to coat completely one-half of the particles in a given substrate while leaving the other half completely uncoated. The average would, of course, be a 50 percent coating but the resultant product would be heterogeneous in character and give non-uniform results. Moreover, care must be used not to form an envelope of the coating material around the outside of an aggregate of the thickener because when the thickener is mixed into an oil to form a grease any such aggregates will be broken down and the heterogeneous character of the aggregates will be developed.

The fact of whether or not a particular coated silica thickener is suitably uniform can be demonstrated by a simple test in which the thickener is pulverized to a finely divided state and then a portion of it is added to a mixture of water and water-immiscible organic liquid such as normal butanol. When this mixture is shaken the products of the present invention will be found in the butanol layer whereas a mixture of non-uniformly treated material would partition partially in the water and partially in the butanol phases.

The oils used in the grease compositions of the invention are water-insoluble lubricating oils. Oils which contain, say, 5–10% of a water soluble component or which are themselves soluble to that extent in water can be classed as essentially water insoluble oils. However, to obtain maximum advantages of the water resistant properties of the thickeners used in this invention, the oil should have as low a solubility in water as possible, and preferably should not be soluble in water to the extent of more than about 1%.

A wide variety of oils can be used. In general, any water-insoluble animal, vegetable or mineral oil, or any synthetic chemical having oily characteristics and lubricating or friction-decreasing properties can be used.

Illustrative of suitable water-insoluble lubricating oils are: hydrocarbon oils such as naphthene base oils, paraffin base oils, and petrolatum; fluorocarbon oils such as the perfluorinated petroleum oils; vegetable oils such as cotton seed oil and castor oil; animal oils such as sperm whale oil, lard oil, blown fish oil and degras; and water-insoluble synthetic chemicals having typical oil characteristics such as di(2-ethylhexyl) adipate, bis-nonyl glutarate, di(2-ethylhexyl) thiopropionate, di(2-ethylhexyl) oxydibutyrate, propylene oxide-tetrahydrofuram copolymer, di(2-ethylhexyl) sebacate; and dimethyl cyclohexyl phthalate.

The choice of a water-insoluble lubricating oil to be used is, of course, based on a consideration of the requirements of the field of application of the finished product. The considerations are analogous to those weighed in selection of an oil to be used with conventional soap thickeners. For example, illustrative of matters to be considered in choosing an oil for a given use are cost, maximum and minimum service temperature, oxidation stability, power consumption during bearing operation, chemical reactivity, and bearing enclosure design.

Thus, low cost would be a reason for choosing a petroleum oil of natural origin. Such oil is suitable for most common uses where extreme conditions are not encountered. If low temperature operation were desired, then low pour point, low viscosity, naphthene base petroleum oils, or synthetic di-ester, or polyether type oils would be favored. For high temperature operation, on the other hand, oxidation resistant and high viscosity oils would be suggested. Fluorocarbon oils should be considered where the product is to be used in corrosive chemical surroundings. Low-viscosity oils are favored for use in bearings where low power consumption is desired, and conversely, high viscosity oils are favored where there are high bearing pressures. Tacky compositions obtainable thru the use of very high viscosity oils are used where there is poor mechanical enclosure of bearings.

In order to avoid decomposition of the thickener, the oils used in combination therewith must not contain available, highly acidic or highly basic components.

The novel and improved greases of this invention are prepared by thickening a lubricating oil, selected as just described, with a unique type of thickener which imparts superior physical and chemical properties to the mixture. This thickener consists of a solid substrate having a partial but not complete organophilic surface coating made up, at least in part, of organosilyl groups. In a preferred aspect of the invention, the coating is made up of both organosilyl and —OR groups wherein R is a hydrocarbon group of 1 to 18 carbon atoms in which the carbon attached to the oxygen is also attached to hydrogen, the ratio of organosilyl to —OR groups being about from 1:10 to 20:1, the organophilizing coating being from one-third to five-sixths of a complete coating of the substrate, and the remainder being unreacted or uncoated.

The substrate is a solid siliceous material having a surface of silica and a surface area of from 100 to 900 square meters per gram. In the sense that the substrate contains silica at least upon its surface it is said to be siliceous, but it will be understood that the particles making up the substrate need not be of a homogeneous siliceous character. In other words, the substrate can be made up of particles of a non-siliceous material such as aluminum oxide, having a surface coating of silica. Similarly, the substrate can consist of a silicate such as an iron or magnesium silicate in which the silica is associated with the metal oxide on the surface as well as in the core.

The substrate may be of natural or synthetic origin. It will be readily apparent that various metal silicates of the type just mentioned are available in nature in the form of various clays, talc, asbestos, volcanic ash, vermiculite, and the like. By suitable techniques these materials can be prepared in forms having the necessary high surface area.

Synthetically prepared materials, both silicates and silica per se, can be prepared by various precipitation methods in a suitable form to be used as substrates. A number of precipitated silicas are described in United States Patent 2,657,149 to Ralph K. Iler and such precipitated silicas are among the preferred substrates.

The substrate must be in solid form. From the description of substrates given in the above-mentioned Iler Patent 2,657,149 it will be understood that the substrate can consist of particles which are aggregates of still smaller ultimate particles. The preferred substrates are of super-colloidal size, but the substrates can be of colloidal dimensions, provided the particles have a solid physical structure.

For the most practical results the substrate should have a specific surface area of about from 100 to 900 square meters per gram. This means that the substrate particles must be either very small or porous. A preferred class of substrates have surface area of about from 200 to 600 square meters per gram, and are in the form of porous aggregates, which can consist of very small ultimate spherical particles joined together into chains and 3-dimensional networks. In a still more preferred class of substrates such pores are at least 4 millimicrons in average diameter, and the aggregates are reinforced, as by accreting active silica thereto. Such substrates, when prepared in aqueous media, can be dried more readily, due to the reinforcement, without collapse of the gel structure, to give particles of very low bulk density. The preparation of preferred substrates is more fully described in columns 3 to 12 of the above-mentioned Iler Patent 2,657,149. Also as therein described, in the case of certain substrates, especially the naturally occurring silicates such as asbestos and clays, the proportion of silicon atoms on the surface of the particles may be undesirably low, and this proportion can be increased by treating the particles with a strong acid, such as sulfuric, to leach out some of the metal ions from the surface, leaving substantially a surface of only silica. Similarly, a coating of amorphous silica may be deposited on the surface of various particles by releasing active silica in the presence of such particles, the product thereby produced being suitable as a substrate.

The reinforcement of a porous silica gel structure already mentioned can also be carried out by heating in water a silica gel having a surface area of from 5 to 100 square meters per milliliter of gel volume and a concentration of 3 to 30 grams $SiO_2$ per 100 milliliters of gel volume, until the gel has a coalescence factor of 30 to 80%, as more fully described in Alexander, Broge and Iler U. S. Patent application Serial No. 274,198, filed February 29, 1952, now U. S. Patent No. 2,765,242, the disclosure of which is herein incorporated by reference.

Particularly preferred substrates also have an open-packed structure. The openness of packing can be determined by measuring the oil absorption. In general, the preferred substrates have an oil absorption of from one to three times the specific surface area in square meters per gram, the oil absorption being expressed in milliliters of oil absorbed, per 100 grams of sample, determined as described in A. S. T. M. Standards for 1949, vol. 4, p. 169.

Now having selected a suitable substrate as above-described, a thickener for use in a grease composition of this invention is made by applying thereto a partial coating of organophilic character, consisting at least in part of organosilyl groups. This can be done as follows:

The substrate is mixed with an organosilane containing a silanol-reactive group to effect chemical reaction between the silanol-reactive group and a surface-silanol group on the substrate and thereby form a chemical bond, through oxygen, between the surface silicon atom and the silyl group of the organosilane. For instance, one mixes dimethyldichlorosilane with an amorphous silica substrate which, of course, has silanol

groups on its surface. One or both of the chloro groups reacts with the hydroxyl of the silanols, splitting out HCl and effecting chemical bonding of the dimethylsilyl group to the surface silicon through oxygen.

It will be understood that the term "organosilane" includes compounds bearing an organosilyl,

group in which R stands for a hydrocarbon group. The hydrocarbon group can be a group such as methyl, ethyl, vinyl, or phenyl. The organosilane also contains at least one silanol-reactive group. By "silanol-reactive" is meant a group which is reactive with the hydroxyl of a surface-silanol group. The term includes halo groups, such as chloro and bromo, alkoxy groups, hydroxyl groups, OM groups, where M is alkali metal, and amino groups—in short, a hydroxyl group or any group which can be hydrolyzed to a hydroxyl. Letting X represent the silanol-reactive group, the organosilane compound will necessarily have the structure

with the other two valences of the silicon being satisfied by the same or different R and X groups, or by being joined to additional organosilyl groups of similar type.

Among the preferred organosilane compounds for coating the substrate are: monomethyltrichlorosilane, dimethyldichlorosilane, trimethylchlorosilane, the corresponding ethyl, vinyl and phenyl chlorosilanes, and the hydroxy and metalloxy compounds of the methyl, ethyl, vinyl, and phenyl silanes, as, for instance diphenylsilanediol.

It will be observed that if the organosilane compound used contains more than one silanol-reactive group, the second and other groups can also react with surface silanols, so that there are two or more points of attachment of the organosilane residue to the substrate. However, the spacial arrangement of such additional silanol-reactive groups may be such that multiple attachment to the substrate is not possible. The presence of excess halo or amino groups may be undesirable, and in this event, they may be removed, after the initial reaction with the substrate silanols. This is accomplished by reacting them with water, alcohol, or another source of hydroxyl groups, whereby to substitute hydroxyl or alkoxy radicals for the excess silanol-reactive groups. Further reaction may, of course, occur through the splitting out of water between silanols on adjacent silicon atoms.

The organosilane may be in gaseous form, as when dimethyldichlorosilane is used, or in liquid form as in the case of diphenyldichlorosilane, or the organosilane may be diluted with another material, as when methylsiliconic acid or methyl sodium siliconate is used in aqueous solution.

One particularly effective process for treating the substrates with organosilyl groups is to start with an aqueous solution of alkali organosiliconate, such as sodium methyl siliconate, remove the alkali with a cation exchange resin to give the free siliconic acid, and then mix an aqueous slurry of the silanol-containing substrate with this siliconic acid solution. The substrate becomes organophilic, so that when mixed with a water-insoluble, or partially water-miscible, alcohol, such as n-butanol, the substrate transfers itself to the alcohol phase, permitting mechanical separation from most, if not all, of the water present.

The treatment with an organosilane as just described provides an organophilic coating on the substrate. It will be understood, however, that the coating need not consist exclusively of organosilyl groups, and it is in fact desirable that the coating contain some —OR groups, R being a hydrocarbon group of 1 to 18 carbon atoms in which the carbon attached to the oxygen is also attached to hydrogen. The —OR groups can be attached to the substrate by esterifying surface silanol groups with a primary or secondary alcohol containing a suitable hydrocarbon group.

The esterification reaction is effected by mixing the organosilyl-coated substrate with the alcohol and heating the mixture to at least 100° C. while maintaining the water content of the system below about 5% by weight of the alcohol. Various details of this reaction are described in the abovementioned Iler Patent 2,657,149 and such details as are applicable are herein incorporated by reference. It is preferred to esterify with short-chain, alkyl alcohols, such as methanol, ethanol, propanol, isopropanol, n-butanol, isobutanol or secondary butyl alcohol.

When a thickener having a mixed coating of organosilyl and ester groups is used the ratio of organosilyl to ester groups can be from 1:10 to 20:1, preferably from 1:3 to 16:1.

Now whether the coating on the substrate consists entirely of organosilyl groups, or of a mixture of organosilyl and ester groups, it should consist of about one third to five-sixths, preferably one-half to five-sixths, of a complete coating on the substrate with organophilizing groups.

To determine the proportion of surface coverage of a particular thickener, one first determines the total surface area of the uncoated, original hydroxylated substrate by the nitrogen adsorption method described by P. H. Emmett, Symposium on new methods for particle size determination in the sub-sieve range, A. S. T. M. March 4, 1941, p. 95. After the organophilizing coating has been applied, the remaining uncoated area can be correlated with the hydroxylated area as measured by a dye adsorption method adapted from Shapiro and Kolthoff, Journal American Chemical Society, 72, 776 (1950). In its present adaption the method consists of removing any free alkali metal ion in the esterified sample, drying it, and intensively mixing it with an anhydrous benzene solution of the acid form of methyl red dye. Surface silanol groups will adsorb the dye whereas organosilyl groups will not. Equilibrium adsorption is reached in about two hours and an equilibrium concentration of 400 milligrams of dye per liter insures saturation adsorption. The methyl red adsorption capacity is calculated from the weight of dye adsorbed per unit weight of sample, the actual adsorption being measured spectrophotometrically at 4750 A. on a Beckmann Model DU Series 2561 spectrophotometer. The specific hydroxylated surface area of the sample, expressed as square meters per gram (m.²/g.) can be calculated from the expression:

$$\frac{\text{Methyl red adsorption capacity}}{269.3} \times 116 \times 10^{-20} \times 6.02 \times 10^{23}$$

269.3 being the molecular weight of the methyl red, $6.02 \times 10^{23}$ being Avogadro's number, and $116 \times 10^{-20}$ being an area factor based on the fact that each methyl red molecule covers an area of 1.16 square millimicrons. By comparing the hydroxylated surface area before and after coating with organosilyl groups, the proportion of surface coverage can be ascertained as already described above.

The amount of a particular organosilane used to effect the desired degree of coverage varies according to the size and number of the organo-groups on the silane. The covering power of certain organosilyl groups has already been given, and from this value for complete coverage the amount necessary for the desired fractional coverage can be readily calculated. Thus, since about 6 monomethylsilyl groups per square millimicron of substrate surface gives a complete coating, a one-third to five-sixths coating requires about 2 to 5.0 groups.

Ester groups have about the same covering power as the corresponding monoalkyl silyl group, e. g., the covering power of the butoxy ester group is approximately equal to that of the monobutylsilyl group.

When the substrate treated with an organosilane is a silica gel it is desirable for best results to use certain precautions when drying the treated product. When the surface area is in the range of 100 to 300 m.²/g. the products can be dried from an aqueous slurry. However, this type of drying often causes a shrinkage of the silica gel structure, making the product more difficult to disperse in an oil, and it is therefore advantageous to transfer the product to a non-aqueous medium before drying, particularly if the surface area of the product is over 300 m.²/g. If the non-aqueous medium is an alcohol it will be apparent that the esterification reaction already described can be effected to advantage.

The coated product need not, of course, be dried, but can be transferred directly to an oil because of its organophilic character.

Having selected an oil and a thickener in accordance with the foregoing disclosure, one makes a grease by intensively mixing the oil and thickener, preferably under conditions of high shear. This can be done in a colloid mill, on an ink mill with a relatively small roll clearance, or in a homogenizer of the Mantin-Gaulin type. Such techniques are more fully described in U. S. Patent 2,676,148 issued April 20, 1954, to Ralph K. Iler.

The proportion of thickener to oil will vary widely, depending upon the consistency of grease desired, the viscosity of the oil, and the efficiency of the thickener. Other things being equal, however, it is found that the partially-coated substrates have a higher thickening efficiency than completely coated substrates. In general, with hydrocarbon oils of the type usually employed for making automotive greases, from 5 to 10% by weight of a preferred thickener will be used according to the present invention.

Preferred thickeners will most often have a dye area of from 5 to 15% of the total nitrogen surface area, an organosilyl to ester group numerical ratio, per square millimicron surface, of from 1:3 to 10:1, a total surface area in the range from 100 to 900 m.²/g., preferably 200 to 600 m.²/g., and an oil absorption of from 1 to 3 times the specific surface area. More particularly preferred, are thickeners having from $3.0/n$ to $5.0/n$ methylsilyl groups per square millimicron, where $n$ is the number of methyl groups in each silyl group (for monomethyl, $n=1$, etc.) and a ratio of silyl groups to butoxy ester groups from 3:1 to 10:1.

The invention will be further understood by reference to the following illustrative examples:

*Example 1*

To make a substrate for conversion to a thickener, a reinforced silica gel was prepared as follows: A colloidal silica sol, containing about 17% by weight of $SiO_2$ and having an $SiO_2:Na_2O$ mole ratio of about 100, and in which the particles were of such a size that they had a surface area of about 420 m.²/g., was passed through an ion-exchange column to remove all of the ions. This column consisted of a mixed bed of anion and cation exchange resins in regenerated form. The deionized sol was diluted to 15% by weight of $SiO_2$, and the pH was adjusted to 5 with aqueous ammonia. The silica sol was then added to an agitated body of n-butanol containing sufficient water to saturate the n-butanol at about 80° C. The ratio of the n-butanol to silica was 5.0 by weight.

The mixture was heated with continued agitation to 85° C., and kept there until gelation of the silica in the dispersed phase occurred. The temperature and agitation were maintained for about 20 minutes after gelation occurred.

The silica:ammonia weight ratio was then adjusted to 100, by the addition of ammonia, thereby raising the pH in the aqueous phase to between 9 and 10. The mixture was maintained at 85° C. for a period of about 6 hours, with mild agitation. Thus a reinforced gel was produced.

To apply a coating of organosilyl groups, the reinforced gel was treated with methyl siliconic acid. This siliconic acid was prepared by passing a solution containing 2% silicone solids ($CH_3SiO_{1.5}$) in the form of sodium monomethyl siliconate through a cation exchange column ("Nalcite" HCR in the hydrogen form) at a rate of 50 ml./min., the column having a diameter of about 1.5". The effluent containing methyl siliconic acid had a pH of about 2.5. This methyl siliconic acid was then added to a slurry of the reinforced gel, above described, after heating the emulsion of gel to about 85° C., 500 ml. of methyl siliconic acid solution being added over a period of 1 hour, at a uniform rate, for each 100 g. of $SiO_2$ in the system. During this addition, the temperature was maintained in the range of 83–87° C.

It was observed that the resulting product separated into two layers. The upper, butanol-rich layer contained all of the silica; the water layer below was essentially clear. The sample was filtered, and the water layer, which had a pH of 9.7, was discarded. n-Butanol was added to the filter cake and the mixture was dehydrated by azeotropic distillation. A part of the uncoated or uncovered silanol groups on the silica substrate was then esterified by heating the anhydrous n-butanol slurry at the normal boiling point for 3 hours. The cooled slurry was finally dried in a vacuum oven at 100° C.

The product had the following characteristics: Surface area by nitrogen adsorption, 310 m.²/g.; by dye adsorption 38 m.²/g.; percent butoxy carbon, 1.05; total carbon, 2.83%, corresponding to 0.42 butoxy group and 2.5 monomethylsilyl groups per square millimicron of surface area; oil absorption 480 ml./100 gram sample. Since 6 monomethyl groups per square millimicron represents maximum coverage, 2.5 monomethyl groups is equivalent to 43% coverage. Likewise 0.42 butoxy group is equivalent to 13% coverage. Thus, this silica product has a coating equivalent to about 56% of the maximum possible and has a dye area which is 12.3% of the total surface area. The ratio of monomethyl to butoxy groups was 7:1, and the oil absorption was 1.5 times the nitrogen surface area.

To make a very viscous grease of the invention, 13.3 parts by weight of this thickener was mixed with 86.7 parts of a Mid-Continent SAE 300 lubricating oil and the mixture was passed 17 times through an ink mill at 0.0015" roll clearance. The resulting product was a clear grease having a micropenetration of 43, corresponding to a thickening index, for the thickener, of 7.7. By using 8 parts of filler to 92 parts of oil, a grease having a micropenetration of 82 was obtained by the above procedure.

*Example 2*

A thickener was prepared as in Example 1, except that 4.0 monomethylsilyl groups and 0.5 butoxy group were applied per square millimicron of surface area of the product. The coverage is calculated to be 67% monomethyl and 16% butoxy or a total of 83% of the maximum.

When mixed with the lubricating oil at 13.3%, the thickener gave a grease having a micropenetration of 47. The grease was stable in the presence of boiling water for several weeks.

We claim:

1. A grease composition consisting essentially of a dispersion, in a lubricating oil, of a thickener consisting of a solid, siliceous substrate having a surface of silica and a surface area of from 100 to 900 square meters per gram, and having chemically bonded to silicon atoms in the silica surface an organophilic coating comprising organosilicon groups in which the organo substituent is a hydrocarbon radical selected from the class consisting of methyl, ethyl, phenyl, monobutyl, and vinyl groups, the coating being about from one-third to five-sixths complete and the thickener being present in sufficient proportion to thicken the oil to a grease.

2. A grease composition consisting essentially of a dispersion, in a lubricating oil, of a thickener consisting of a substrate composed of amorphous silica particles which appear essentially spherical upon examination under an electron microscope, said particles being joined together into porous aggregates having an average surface area of from 200 to 600 square meters per gram, and having chemically bonded to silicon atoms in the silica surface an organophilic coating comprising organosilicon groups in which the organo substituent is a hydrocarbon radical selected from the class consisting of methyl, ethyl, phenyl, monobutyl, and vinyl groups, the coating being about from one-third to five-sixths complete and the thickener being present in sufficient proportion to thicken the oil to a grease.

3. A grease composition consisting essentially of a dispersion, in a lubricating oil, of a thickener consisting of a substrate composed of amorphous silica particles which appear essentially spherical upon examination under an electron microscope, said particles being joined together into porous aggregates having an average pore diameter of at least 4 millimicrons and an average surface area of from 200 to 600 square meters per gram, and having chemically bonded to silicon atoms in the silica surface an organophilic coating comprising organosilicon groups in which the organo substituent is a hydrocarbon radical selected from the class consisting of methyl, ethyl, phenyl, monobutyl, and vinyl groups, the coating being about from one-third to five-sixths complete and the thickener being present in sufficient proportion to thicken the oil to a grease.

4. A grease composition consisting essentially of a dispersion, in a lubricating oil, of a thickener consisting of a substrate composed of amorphous silica particles which appear essentially spherical upon examination under an electron microscope, said particles being joined together into porous aggregates reinforced with accreted amorphous silica and having an average pore diameter of at least 4 millimicrons and an average surface area of from 200 to 600 square meters per gram, and having chemically bonded to silicon atoms in the silica surface an organophilic coating comprising organosilicon groups in which the organo substituent is a hydrocarbon radical selected from the class consisting of methyl, ethyl, phenyl, monobutyl, and vinyl groups, the coating being about from one-third to five-sixths complete, and the thickener being present in sufficient proportion to thicken the oil to a grease.

5. A grease composition consisting essentially of a dispersion, in a lubricating oil, of a thickener consisting of a substrate composed of amorphous silica particles which appear essentially spherical upon examination under an electron microscope, said particles being joined together into porous aggregates reinforced with accreted amorphous silica and having an average pore diameter of at least 4 millimicrons and an average surface area of from 200 to 600 square meters per gram, and having chemically bonded to silicon atoms in the silica surface an organophilic coating consisting of organosilyl groups in which the organo substituent is a hydrocarbon radical selected from the class consisting of methyl, ethyl, phenyl, monobutyl, and vinyl groups, and —OR groups, R being a hydrocarbon group of from 1 to 18 carbon atoms in which the carbon attached to oxygen is also attached to hydrogen, the ratio of organosilyl groups to —OR groups being from 1:3 to 1:16, the coating being about from one half to five-sixths complete, and the thickener being present in sufficient proportion to thicken the oil to a grease.

6. A grease composition consisting essentially of a dispersion, in a lubricating oil, of a thickener consisting of a substrate composed of amorphous silica particles which appear essentially spherical upon examination under an electron microscope, said particles being joined together into porous aggregates reinforced with accreted amorphous silica and having an average surface area of from 200 to 600 square meters per gram, and having chemically bonded to silicon atoms in the silica surface an organophilic coating consisting of organosilyl groups, in which the organo substituent is a hydrocarbon radical selected from the class consisting of methyl, ethyl, phenyl, monobutyl, and vinyl, and —OR groups, R being a hydrocarbon group of 1 to 18 carbon atoms in which the carbon attached to oxygen is also attached to hydrogen, the ratio of organosilyl groups to ester groups being from 1:10 to 20:1, and the coating being about from one third to five-sixths complete, the thickener being present in the proportion of 5 to 10% by weight, based upon the weight of oil.

References Cited in the file of this patent

UNITED STATES PATENTS

| | | |
|---|---|---|
| 2,583,604 | Sirianni et al. | Jan. 29, 1952 |
| 2,583,606 | Sirianni et al. | Jan. 29, 1952 |
| 2,584,085 | Stross | Jan. 29, 1952 |
| 2,610,167 | Te Gratenhuis | Sept. 9, 1952 |
| 2,676,148 | Iler | Apr. 20, 1954 |
| 2,705,222 | Wagner | Mar. 29, 1955 |